United States Patent
Yu et al.

(10) Patent No.: US 8,122,326 B2
(45) Date of Patent: *Feb. 21, 2012

(54) ENCODING AND ERROR CORRECTION SYSTEM FOR ENHANCED PERFORMANCE OF LEGACY COMMUNICATIONS NETWORKS

(75) Inventors: Yanbin Yu, Fremont, CA (US); Qingyi Zheng, Newark, CA (US); Cindy Chun Wang, Newark, CA (US)

(73) Assignee: Marvell World Trade Ltd., St. Michael (BB)

( * ) Notice: Subject to any disclaimer, the term of this patent is extended or adjusted under 35 U.S.C. 154(b) by 114 days.

This patent is subject to a terminal disclaimer.

(21) Appl. No.: 12/772,588

(22) Filed: May 3, 2010

(65) Prior Publication Data

US 2010/0229073 A1    Sep. 9, 2010

Related U.S. Application Data

(63) Continuation of application No. 11/256,218, filed on Oct. 21, 2005, now Pat. No. 7,712,005.

(51) Int. Cl.
*H03M 13/00* (2006.01)
(52) U.S. Cl. .............. 714/776; 714/747; 714/790
(58) Field of Classification Search ............ 714/776, 714/747, 790, 822
See application file for complete search history.

(56) References Cited

U.S. PATENT DOCUMENTS

| | | | |
|---|---|---|---|
| 5,655,052 | A | 8/1997 | Nakai et al. |
| 5,715,356 | A | 2/1998 | Hirayama et al. |
| 6,058,106 | A | 5/2000 | Cudak et al. |
| 6,256,509 | B1 | 7/2001 | Tanaka et al. |
| 6,295,302 | B1 | 9/2001 | Hellwig et al. |
| 6,754,181 | B1 * | 6/2004 | Elliott et al. ............ 370/252 |
| 7,010,001 | B2 | 3/2006 | Odenwalder |
| 7,188,300 | B2 | 3/2007 | Eriksson et al. |
| 7,190,681 | B1 * | 3/2007 | Wu .......................... 370/316 |
| 2002/0006138 | A1 | 1/2002 | Odenwalder |
| 2004/0120302 | A1 | 6/2004 | Sebire et al. |

OTHER PUBLICATIONS

PCT Notification of Transmittal of the International Search Report dated Aug. 4, 2006 for International Application No. PCT/US05/38044; 4 pages.
Written Opinion of the International Seraching Authority datd Aug. 4, 2006 for Application No. PCT/US05/38044; 4 pages.

* cited by examiner

*Primary Examiner* — Fritz Alphonse

(57) ABSTRACT

A system includes a header stripper configured to strip header data from a plurality of legacy system frames. Each of the plurality of legacy system frames (i) being in accordance with a legacy system frame format and (ii) including a header block and a traffic channel block. A first encoder is configured to encode speech data for a plurality of slots of the traffic channel blocks. A second encoder is configured to encode the stripped header data as a frame header. A combiner is configured to combine the frame header and the encoded speech data to generate a frame. A segmenter segments the frame into a plurality of segments. A transmitter is configured to transmit the plurality of segments as traffic channel data in accordance with the legacy system frame format.

13 Claims, 5 Drawing Sheets

| AMR Rate | AMR Mode | Mode | Class |
|---|---|---|---|
| 12.2kbps | 111 | 11 | 1(class1) |
| 10.2kbps | 110 | 11 | 0(class2) |
| 7.95kbps | 101 | 10 | 1(class1) |
| 7.4kbps | 100 | 10 | 0(class2) |
| 6.7kbps | 011 | 01 | 1(class1) |
| 5.9kbps | 010 | 01 | 0(class2) |
| 5.15kbps | 001 | 00 | 1(class1) |
| 4.75kbps | 000 | 00 | 0(class2) |

ENCODING AND ERROR CORRECTION SYSTEM FOR ENHANCED PERFORMANCE OF LEGACY COMMUNICATIONS NETWORKS

CROSS-REFERENCE TO RELATED APPLICATIONS

This application is a continuation of U.S. patent application Ser. No. 11/256,218, filed Oct. 21, 2005, now U.S. Pat. No. 7,712,005. The disclosure of the above application is incorporated herein by reference in its entirety.

FIELD OF THE INVENTION

This invention relates generally to the field of encoding and error correction for transmission systems and, more particularly, to use of an advanced vocoder with bit mapping and encoding for retrofit of legacy communications systems to enhance error correction performance.

BACKGROUND OF THE INVENTION

Waveform source coding and decoding (codec) is widely used in early digital mobile communication systems such as the Personal Handyphone System (PHS). Due to technology limitations at the time of implementation, some of the system designs did not provide appropriate channel encoding/decoding to protect the transferred data. For such systems, when the channel quality condition degrades, the ensuing high bit error rate makes voice performance unacceptable and some important control bits are easily corrupted. As the result, upper layer protocol and control mechanisms in the system would be likely active to turn off the channel. This is one of the most prevalent reasons for a lost connection during an ongoing communication session.

There are adaptive multi-rate (AMR) vocodec and corresponding channel coding capabilities in some advanced 2 G mobile systems and all the 3 G systems. Under the AMR standard, there are 8 different data rates for code Excited Linear Prediction (CELP) speech codec. These data rates range from 12.2 kbps to 4.75 kps. The more speech information is transferred, the better the voice performance is achieved. The basic approach employed in the AMR standard is that when the channel condition become worse, the system uses the modes with lower data transfer rate (of course, the voice performance is worse.). This saves more channel bandwidth and other resources for the system to increase the bit error correction ability. The lack comparable technology in legacy digital mobile systems (such as PHS) derives from under-developed algorithms and the expense of integrated circuit resources related to power and instruction speed requirements. With the advent of silicon technology, the use of digital signal processors (DSP) is no longer a luxury element in a PHS handset.

It is therefore desirable to make use of AMR vocodec capability in legacy systems.

It is also desirable to apply AMR and error correction in a manner which can be retrofit into early 2 G systems by re-arranging bit mapping to provide up to 6 to 7 dB gain for bit error reduction ability for certain AMR modes.

SUMMARY OF THE INVENTION

An encoding and error correction system and method according to the present invention employs the modern benefits of AMR codec by stripping header data from a plurality of legacy system frames having header and traffic channel (TCH) data blocks. Speech data is then encoded using the AMR to create bits for a data block substantially the same as contained in the plurality of frames. The stripped header data is encoded as a long frame header using a fixed convolution coder. The speech data is then convolutionally encoded and the long frame header and encoded speech data are combined as a long frame. The long frame is then deconstructed into a plurality of equal segments and the segments are transmitted as TCH data in the legacy system frame format.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

The present invention is defined for an exemplary embodiment employing the PHS communication system and standard (a 2 G legacy mobile system). The PHS system incorporating technology according to the invention will be referred to herein as Advanced PHS (APHS).

Figure 1:
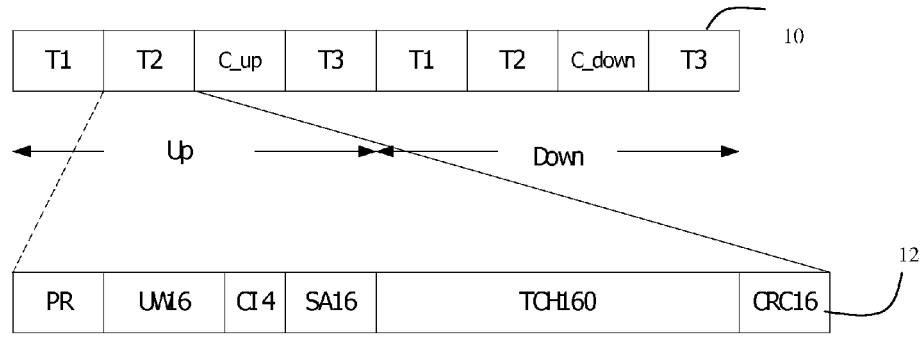
FIG. 1 is a block diagram of a prior art PHS system traffic channel frame and slot structure.

Data mapping of the Traffic Channel (TCH) of an exemplary PHS system is shown in FIG. 1. PHS is a time division multiplex (TDMA) system. One frame 10 is 5 ms in length and is divided into 8 slots, four for uplink and four for downlink. In each direction, three slots, T1, T2 and T3, are available for three different users and the last slot is the common control channel alternating uplink mode commands and downlink mode commands, C_up and C_down, for all three users.

Slot T2 is expanded in FIG. 1 as an example slot 12 and discussed in detail for the explanation of the invention herein. Areas PR and UW are employed for synchronization of the physical layer. Block UW incorporates 16 bits. As discussed in greater detail subsequently, PR and UW are inserted in the transmitted frame before the decoder so that they cannot be encoded. CI and SA are the protocol for slot format information and connection status and are important for connection reliability. Block CI contains 4 bits while block SA contains 16 bits. TCH contains the speech data and comprises 160 bits. The CRC block of 16 bits provides the error detection bits. It can be seen that within one frame, there are 160 bits of speech data and the whole vocodec rate is therefore 160/0.05=32 Kbps. This is the data rate for ADPCM (ITU G.726) as employed in PHS.

The present invention employs AMR codec in combination with bit mapping to create frames compatible with PHS transmission standards while adding encoding for performance enhancement. There are eight vocodec modes in an AMR system. The eight modes are defined by GSM and 3GPP international standards and the data rates employed are 12.2, 10.2, 7.95, 7.4, 6.7, 5.9, 5.15, and 4.75 (Kbps). Each of these rates is lower than the 32 Kbps basic capability of the PHS system and allows flexibility in formatting the data to be encoded.

As will be described in greater detail subsequently, the source speech and channel coding provided in the present invention is accomplished within 20 ms, or four PHS slot times. Interleaving of 20 ms blocks is beneath the sensitivity threshold of the human ear. The new encoding "frame" is referred to herein as a long-frame. To be compatible with the bit mapping of the PHS standard frame, the present invention does not make use of the CI, SA and CRC areas. That is, the encoded CI and SA data are put into the TCH block. The vocodec mode related message is encoded with a particular channel code mode and employs a special area and encoder. The larger the channel coding data block size, the better the result (higher bit error ability). Finally, a new control channel Robust AMR Traffic Synchronized Control Channel (RATSCCH) for long-frame synchronization is employed at the very beginning of the connection between of handset and the base station. RATSCCH is also used for a mode message in some special cases.

Figure 2:
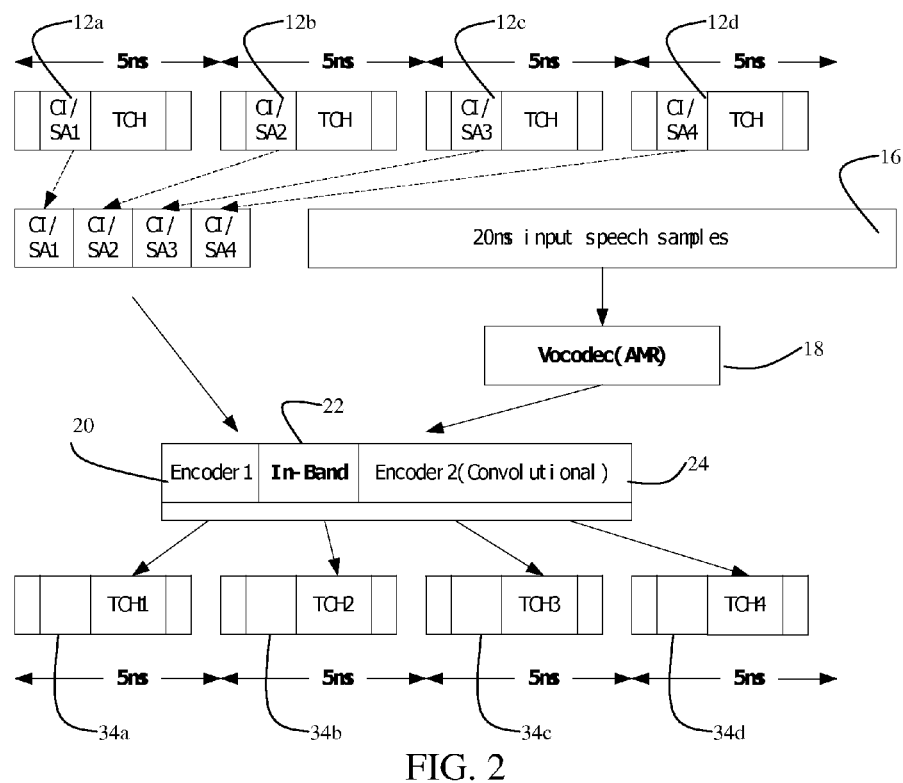
FIG. 2 is a block diagram of bit mapping and encoding for creation of a long frame for deconstruction into standard PHS slots for transmission.

The TCH block is used for speech data, SA/CI and in-band data. Different vocodec modes have different speech and channel encoding parameters and require different data transfer rates. The SA/CI and in-band information are encoded and need a constant data rate. The encoding and bit mapping in APHS are shown in FIG. 2.

Figure 3:
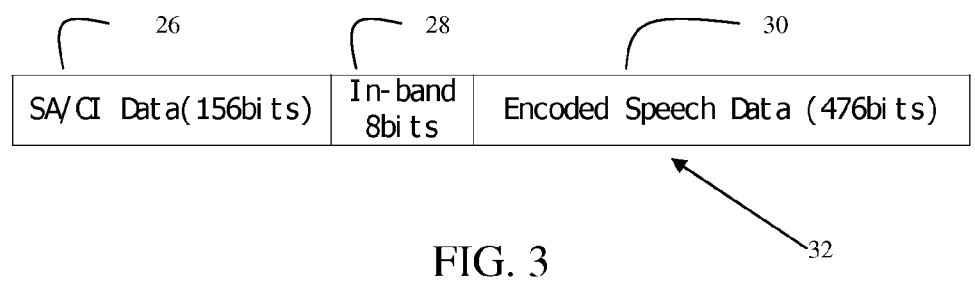
FIG. 3 is a block diagram of the bit mapped long frame.

Four PHS slots 12a, 12b, 12c and 12d nominally provide the long frame. CI and SA data for the four slots are stripped and combined in an APHS long frame header block 14. Nominally 20 ms of speech samples 16 are processed through AMR vocodec 18. The long frame header data is processed through a first encoder 20 and in-band data 22 is inserted followed by the AMR processed speech samples which are routed through a second encoder 24 which is convolutional. The resulting long frame is shown in FIG. 3 wherein the header 26 comprises 156 bits of CI and SA data, an in-band block 28 carries 8 bits followed by an encoded speech data block 30 of 476 bits resulting in a long frame 32 of 640 bits. As previously described, this long frame is then split into four 160 bit lengths for insertion into the standard TCH block of 4 APHS frames 34a, 34b, 34c, and 34d for transmission.

In the PHS system, the data rate resource in area TCH for use in a long-frame is TCH*4=160*4=640 bits. For compatibility, the original area containing SA/CI data in each slot is reserved in APHS but the data is ignored for processing in the APHS. Message SA/CI together with in-band message data are encoded and put in original TCH area.

The maximum encoded speech data in a long-frame is 476 bits in the APHS embodiment described. Different vocode mode and channel code mode with different parameters are combined to generate different encoded speech data blocks of different size. If the generated encoded speech data block is larger than 476 bits, some bits have to be punctured. In APHS embodiment disclosed herein, channel coding is accomplished using a convolutional encoder. Other channel coding methods are employed in alternative embodiments.

Based on interleaving of the data, as will be discussed subsequently, the CI data need only be transmitted once in each long frame (the equivalent of one of every 4 PHS frames). The SA data needs to be transmitted for every slot. The resulting long frame data for SA/CI is shown in Table 1.

TABLE 1

| Name | SA0 | SA1 | SA2 | SA3 |
|---|---|---|---|---|
| Number of bits | 16 | 16 | 16 | 16 |
| Name | CI | | | |
| Number of bits | 4 | | | |
| Number of CRC bits | 6 | | | |
| | Polynomial $D^6 + D^5 + D^3 + D^2 + d^1 + 1$ | | | |
| Number of input bits for convolutional coder | 74 | | | |
| Polynomial for ½ convolution coder | Polynomial $G0/G0 = 1$ $G1/G0 = 1 + D + D^3 + D^4/1 + D^3 + D^4$ with trailing 8 bits | | | |
| Number of output bits | 148 + 8 = 156 | | | |

Eight bits are employed for mode information which is mapped into the final 8 bits of the long frame as will be shown below.

Table 2 shows the Codec mode and the associated convolution rate, the number of bits input into the convolutional coder, the resulting output number of bits from the coder, the number of SA bits after CRC and a convolutional encoder, the total number of bits and the preferred class.

TABLE 2

| Codec mode | Rate | Number of input bits to convolutional coder | Number of output bits from convolutional coder (it should be 476) | Number of SA bits after CRC and 1/2 convolution coder | Total Number of bits for one block 20 ms (632 + 8 = 640 total) | Preferred Class |
|---|---|---|---|---|---|---|
| TCH/AFS 12.2 | 1/2 | 250 | 508 puncturing 32 bits | 156 | 632 | 1 |
| TCH/AFS 10.2 | 1/3 | 210 | 642 puncturing 166 bits | 156 | 632 | 2 |
| TCH/AFS 7.95 | 1/3 | 165 | 513 puncturing 37 bits | 156 | 632 | 1 |
| TCH/AFS 7.4 | 1/3 | 154 | 474 | 156 | 630 | 2 |
| TCH/AFS 6.7 | 1/4 | 140 | 576 puncturing 100 | 156 | 632 | 1 |

TABLE 2-continued

| Codec mode | Rate | Number of input bits to convolutional coder | Number of output bits from convolutional coder (it should be 476) | Number of SA bits after CRC and 1/2 convolution coder | Total Number of bits for one block 20 ms (632 + 8 = 640 total) | Preferred Class |
|---|---|---|---|---|---|---|
| TCH/AFS 5.9 | 1/4 | 124 | 520 puncturing 44 | 156 | 632 | 2 |
| TCH/AFS 5.15 | 1/5 | 109 | 565 puncturing 89 | 156 | 632 | 1 |
| TCH/AFS 4.75 | 1/5 | 101 | 535 puncturing 59 | 156 | 632 | 2 |

As can be seen in the table, with the fixed number of bits for SA/CI data of 156 and the total 640 bits available to fit within the PHS TCH of 160 bits for four frames, bits from the voice data convolutional encoder should total 476 and bits must be punctured to fit the long frame.

Exemplary convolution coding for each of the codec modes is shown in Tables 3—10 with definition of the punctured bits to maintain the long frame size of 640 bits.

TABLE 3

TCH/AFS12.2 Codec:

The block of 250 bits {u(0)... u(249)} is encoded with the 1/2 rate convolutional code defined by the following polynomials:
G0/G0 = 1
G1/G0 = $1 + D + D^3 + D^4 / 1 + D^3 + D^4$
resulting in 508 coded bits, {C(0)... C(507)} defined by:
r(k)         = u(k) + r(k−3) + r(k−4)
C(2k)        = u(k)
C(2k+1)      = r(k)+r(k−1)+r(k−3)+r(k−4)          for k = 0, 1, ..., 249; r(k) = 0 for k<0
and (for termination of the coder):
r(k)         = 0
C(2k)        = r(k−3)+r(k−4)
C(2k+1)      = r(k)+r(k−1)+r(k−3)+r(k−4)          for k = 250, 251, ..., 253
The code is punctured in such a way that the following 32 bits: C(417), C(421),
C(425), C(427), C(429), C(433), C(437), C(441), C(443), C(445), C(449), C(453),
C(457), C(459), C(461), C(465), C(469), C(473), C(475), C(477), C(481), C(485),
C(489), C(491), C(493), C(495), C(497), C(499), C(501), C(503), C(505) and
C(507) are not transmitted.

TABLE 4

TCH/AFS10.2 Codec:

The block of 210 bits {u(0)... u(209)} is encoded with the 1/3 rate convolutional code defined by the following polynomials:
G1/G3 = $1 + D + D^3 + D^4 / 1 + D + D^2 + D^3 + D^4$
G2/G3 = $1 + D^2 + D^4 / 1 + D + D^2 + D^3 + D^4$
G3/G3 = 1
resulting in 642 coded bits, {C(0)... C(641)} defined by:
r(k)         = u(k) + r(k−1) + r(k−2) + r(k−3) + r(k−4)
C(3k)        = r(k) + r(k−1) + r(k−3) + r(k−4)
C(3k+1)      = r(k)+r(k−2)+r(k−4)
C(3k+2)      = u(k)                                for k = 0, 1, ..., 209
and (for termination of the coder):
r(k)         = 0
C(3k)        = r(k)+r(k−1) + r(k−3) + r(k−4)
C(3k+1)      = r(k)+r(k−2)+r(k−4)
C(3k+2)      = r(k−1)+r(k−2)+r(k−3)+r(k−4)         for k = 210, 211, ..., 213
The code is punctured in such a way that the following 22 bits:
C(1), C(4), C(7), C(10), C(16), C(19), C(22), C(28), C(31), C(34), C(40), C(43),
C(46), C(52), C(55), C(58), C(64), C(67), C(70), C(76), C(79), and C(82) are not
transmitted. All these operations will result in 620 bits.
The code is punctured in such a way that the following 166 bits: C(1), C(4), C(7),
C(10), C(16), C(19), C(22), C(28), C(31), C(34), C(40), C(43), C(46), C(52),
C(55), C(58), C(64), C(67), C(70), C(76), C(79), C(82), C(88), C(91), C(94),

TABLE 4-continued

TCH/AFS10.2 Codec:

C(100), C(103), C(106), C(112), C(115), C(118), C(124), C(127), C(130), C(136), C(139), C(142), C(148), C(151), C(154), C(160), C(163), C(166), C(172), C(175), C(178), C(184), C(187), C(190), C(196), C(199), C(202), C(208), C(211), C(214), C(220), C(223), C(226), C(232), C(235), C(238), C(244), C(247), C(250), C(256), C(259), C(262), C(268), C(271), C(274), C(280), C(283), C(286), C(292), C(295), C(298), C(304), C(307), C(310), C(316), C(319), C(322), C(325), C(328), C(331), C(334), C(337), C(340), C(343), C(346), C(349), C(352), C(355), C(358), C(361), C(364), C(367), C(370), C(373), C(376), C(379), C(382), C(385), C(388), C(391), C(394), C(397), C(400), C(403), C(406), C(409), C(412), C(415), C(418), C(421), C(424), C(427), C(430), C(433), C(436), C(439), C(442), C(445), C(448), C(451), C(454), C(457), C(460), C(463), C(466), C(469), C(472), C(475), C(478), C(481), C(484), C(487), C(490), C(493), C(496), C(499), C(502), C(505), C(508), C(511), C(514), C(517), C(520), C(523), C(526), C(529), C(532), C(535), C(538), C(541), C(544), C(547), C(550), C(553), and C(556) are not transmitted.

TABLE 5

TCH/AFS7.95 Codec:

The block of 165 bits $\{u(0)... u(164)\}$ is encoded with the 1/3 rate convolutional code defined by the following polynomials:
$G4/G4 = 1$
$G5/G4 = 1 + D + D^4 + D^6 / 1 + D^2 + D^3 + D^5 + D^6$
$G6/G4 = 1 + D + D^2 + D^3 + D^4 + D^6 / 1 + D^2 + D^3 + D^5 + D^6$
generating 513 coded bits, $\{C(0)... C(512)\}$ defined by:
$r(k) = u(k) + r(k-2) + r(k-3) + r(k-5) + r(k-6)$
$C(3k) = u(k)$
$C(3k+1) = r(k)+r(k-1)+r(k-4)+r(k-6)$
$C(3k+2) = r(k)+r(k-1)+r(k-2)+r(k-3)+r(k-4)+r(k-6)$
for $k = 0, 1, ..., 164$;
$r(k) = 0$ for $k < 0$
and (for termination of the coder):

TABLE 5-continued

TCH/AFS7.95 Codec:

$r(k) = 0$
$C(3k) = r(k-2) + r(k-3) + r(k-5) + r(k-6)$
$C(3k+1) = r(k)+r(k-1)+r(k-4)+r(k-6)$
$C(3k+2) = r(k)+r(k-1)+r(k-2)+r(k-3)+r(k-4)+r(k-6)$
for $k = 165, 166, ..., 170$
The code is punctured in such a way that the following 37 bits:
C(1), C(2), C(4), C(5), C(8), C(22), C(70), C(118), C(166), C(214), C(262), C(310), C(317), C(319), C(325), C(332), C(334), C(341), C(343), C(349), C(356), C(358), C(365), C(367), C(373), C(380), C(382), C(385), C(389), C(391), C(397), C(404), C(406), C(409), C(413), C(415), and C(512) are not transmitted.

TABLE 6

TCH/AFS7.4 Codec:

The block of 154 bits $\{u(0)... u(153)\}$ is encoded with the 1/3 rate convolutional code defined by the following polynomials:
$G1/G3 = 1 + D + D^3 + D^4 / 1 + D + D^2 + D^3 + D^4$
$G2/G3 = 1 + D^2 + D^4 / 1 + D + D^2 + D^3 + D^4$
$G3/G3 = 1$
resulting in 474 coded bits, $\{C(0)... C(473)\}$ defined by:
$r(k) = u(k) + r(k-1) + r(k-2) + r(k-3) + r(k-4)$
$C(3k) = r(k) + r(k-1) + r(k-3) + r(k-4)$
$C(3k+1) = r(k)+r(k-2)+r(k-4)$
$C(3k+2) = u(k)$      for $k = 0, 1, ..., 153$
and (for termination of the coder):
$r(k) = 0$
$C(3k) = r(k)+r(k-1) + r(k-3) + r(k-4)$
$C(3k+1) = r(k)+r(k-2)+r(k-4)$
$C(3k+2) = r(k-1)+r(k-2)+r(k-3)+r(k-4)$      for $k = 154, 155, ..., 157$

TABLE 7

TCH/AFS6.7 Codec:

The block of 140 bits $\{u(0)... u(139)\}$ is encoded with the 1/4 rate convolutional code defined by the following polynomials:
$G1/G3 = 1 + D + D^3 + D^4 / 1 + D + D^2 + D^3 + D^4$
$G2/G3 = 1 + D^2 + D^4 / 1 + D + D^2 + D^3 + D^4$
$G3/G3 = 1$
$G3/G3 = 1$
producing 576 coded bits, $\{C(0)... C(575)\}$ defined by:
$r(k) = u(k) + r(k-1) + r(k-2) + r(k-3) + r(k-4)$
$C(4k) = r(k) + r(k-1) + r(k-3) + r(k-4)$
$C(4k+1) = r(k)+r(k-2)+r(k-4)$
$C(4k+2) = u(k)$
$C(4k+3) = u(k)$      for $k = 0, 1, ..., 139$; $r(k) = 0$ for $k<0$ TABLE 7-continued TCH/AFS6.7 Codec:

Also (for termination of the coder):
r(k)        = 0
C(4k)       = r(k)+r(k−1) + r(k−3) + r(k−4)
C(4k+1)     = r(k)+r(k−2)+r(k−4)
C(4k+2)     = r(k−1)+r(k−2)+r(k−3)+r(k−4)
C(4k+3)     = r(k−1)+r(k−2)+r(k−3)+r(k−4)           for k = 140, 141, ..., 143
The code is punctured in such a way that the following 100 bits: C(1), C(3), C(7), C(11), C(15), C(27), C(39), C(55), C(67), C(79), C(95), C(107), C(119), C(135), C(147), C(159), C(175), C(187), C(199), C(215), C(227), C(239), C(255), C(267), C(279), C(287), C(291), C(295), C(299), C(303), C(307), C(311), C(315), C(319), C(323), C(327), C(331), C(335), C(339), C(343), C(347), C(351), C(355), C(359), C(363), C(367), C(369), C(371), C(375), C(377), C(379), C(383), C(385), C(387), C(391), C(393), C(395), C(399), C(401), C(403), C(407), C(409), C(411), C(415), C(417), C(419), C(423), C(425), C(427), C(431), C(433), C(435), C(439), C(441), C(443), C(447), C(449), C(451), C(455), C(457), C(459), C(463), C(465), C(467), C(471), C(473), C(475), C(479), C(481), C(483), C(487), C(489), C(491), C(495), C(497), C(499), C(503), C(505), C(507), and C(511) are not transmitted.

20

TABLE 8

TCH/AFS5.9 Codec:

The block of 124 bits {u(0)... u(123)} is encoded with the 1/4 rate convolution code defined by the following polynomials:
$G4/G6 = 1 + D^2 + D^3 + D^5 + D^6 / 1 + D + D^2 + D^3 + D^4 + D^6$
$G5/G6 = 1 + D + D^3 + D^4 + D^6 / 1 + D + D^2 + D^3 + D^4 + D^6$
$G6/G6 = 1$
$G6/G6 = 1$
generating in 520 coded bits, {C(0)... C(519)} defined by:
r(k)        = u(k) + r(k−1) + r(k−2) + r(k−3) + r(k−4) + r(k−6)
C(4k)       = r(k) + r(k−2) + r(k−3) + r(k−5) + r(k−6)
C(4k+1)     = r(k) + r(k−1) + r(k−4) + r(k−6)
C(4k+2)     = u(k)
C(4k+3)     = u(k)
                                          for k = 0, 1, ..., 123; r(k) = 0 for k<0 and (for termination of the coder):
r(k)        = 0
C(4k)       = r(k)+r(k−2) + r(k−3) + r(k−5) + r(k−6)
C(4k+1)     = r(k)+r(k−1)+r(k−4)+r(k−6)
C(4k+2)     = r(k−1)+r(k−2)+r(k−3)+r(k−4)+r(k−6)
C(4k+3)     = r(k−1)+r(k−2)+r(k−3)+r(k−4)+r(k−6)
                                          for k = 124, 125, ..., 129
The code is punctured in such a way that the following 44 bits: C(0), C(1), C(3), C(5), C(7), C(11), C(15), C(31), C(47), C(63), C(79), C(95), C(111), C(127), C(143), C(159), C(175), C(191), C(207), C(223), C(239), C(255), C(271), C(287), C(303), C(319), C(327), C(331), C(335), C(343), C(347), C(351), C(359), C(363), C(367), C(375), C(379), C(383), C(391), C(395), C(399), C(407), C(411), and C(415) are not transmitted.

TABLE 9

TCH/AFS5.15 Codec:

The block of 109 bits {u(0)... u(108)} is encoded with the 1/5 rate convolution code defined by the following polynomials:
$G1/G3 = 1 + D + D^3 + D^4 / 1 + D + D^2 + D^3 + D^4$
$G1/G3 = 1 + D + D^3 + D^4 / 1 + D + D^2 + D^3 + D^4$
$G2/G3 = 1 + D^2 + D^4 / 1 + D + D^2 + D^3 + D^4$
$G3/G3 = 1$
$G3/G3 = 1$
generating 565 coded bits, {C(0)... C(564)} defined by:
r(k)        = u(k) + r(k−1) + r(k−2) + r(k−3) + r(k−4)
C(5k)       = r(k) + r(k−1) + r(k−3) + r(k−4)
C(5k+1)     = r(k) + r(k−1) + r(k−3) + r(k−4)
C(5k+2)     = r(k)+r(k−2)+r(k−4)
C(5k+3)     = u(k)
C(5k+4)     = u(k)
for k = 0, 1, ..., 108;

TABLE 9-continued

TCH/AFS5.15 Codec:

r(k) = 0 for k<0 and (for termination of the coder):
r(k)      = 0
C(5k)     = r(k)+r(k−1) + r(k−3) + r(k−4)
C(5k+1)   = r(k)+r(k−1) + r(k−3) + r(k−4)
C(5k+2)   = r(k)+r(k−2)+r(k−4)
C(5k+3)   = r(k−1)+r(k−2)+r(k−3)+r(k−4)
C(5k+4)   = r(k−1)+r(k−2)+r(k−3)+r(k−4)      for k = 109, 110, ..., 112
The code is punctured in such a way that the following 89 bits: C(0), C(4), C(5),
C(9), C(10), C(14), C(15), C(20), C(25), C(30), C(35), C(40), C(50), C(60), C(70),
C(80), C(90), C(100), C(110), C(120), C(130), C(140), C(150), C(160), C(170),
C(180), C(190), C(200), C(210), C(220), C(230), C(240), C(250), C(260), C(270),
C(280), C(290), C(300), C(310), C(315), C(320), C(325), C(330), C(334), C(335),
C(340), C(344), C(345), C(350), C(354), C(355), C(360), C(364), C(365), C(370),
C(374), C(375), C(380), C(384), C(385), C(390), C(394), C(395), C(400), C(404),
C(405), C(410), C(414), C(415), C(420), C(424), C(425), C(430), C(434), C(435),
C(440), C(444), C(445), C(450), C(454), C(455), C(460), C(464), C(465), C(470),
C(474), C(475), C(480), and C(484) are not transmitted.

TABLE 10

TCH/AFS4.75 Codec:

The block of 101 bits {u(0)... u(100)} is encoded with the 1/5 rate convolutional
code defined by the following polynomials:
G4/G6 = 1 + $D^2$ + $D^3$ + $D^5$ + $D^6$ / 1 + D + $D^2$ + $D^3$ + $D^4$ + $D^6$
G4/G6 = 1 + $D^2$ + $D^3$ + $D^5$ + $D^6$ / 1 + D + $D^2$ + $D^3$ + $D^4$ + $D^6$
G5/G6 = 1 +D + $D^4$ + $D^6$ / 1 + D + $D^2$ + $D^3$ + $D^4$ + $D^6$
G6/G6 = 1
G6/G6 = 1
Generating 535 coded bits, {C(0)... C(534)} defined by:
r(k)      = u(k) + r(k−1) + r(k−2) + r(k−3) + r(k−4) + r(k−6)
C(5k)     = r(k) + r(k−2) + r(k−3) + r(k−5) + r(k−6)
C(5k+1)   = r(k) + r(k−2) + r(k−3) + r(k−5) + r(k−6)
C(5k+2)   = r(k) + r(k−1) + r(k−4) + r(k−6)
C(5k+3)   = u(k)
C(5k+4)   = u(k)
                                                 for k = 0, 1, ..., 100; r(k) =
0 for k<0 and (for termination of the coder):
r(k)      = 0
C(5k)     = r(k)+r(k−2) + r(k−3) + r(k−5) + r(k−6)
C(5k+1)   = r(k)+r(k−2) + r(k−3) + r(k−5) + r(k−6)
C(5k+2)   = r(k)+r(k−1)+r(k−4)+r(k−6)
C(5k+3)   = r(k−1)+r(k−2)+r(k−3)+r(k−4)+r(k−6)
C(5k+4)   = r(k−1)+r(k−2)+r(k−3)+r(k−4)+r(k−6)
                                                 for k = 101, 102, ..., 106
The code is punctured in such a way that the following 59 bits: C(0), C(5), C(15),
C(25), C(35), C(45), C(55), C(65), C(75), C(85), C(95), C(105), C(115), C(125),
C(135), C(145), C(155), C(165), C(175), C(185), C(195), C(205), C(215), C(225),
C(235), C(245), C(255), C(265), C(275), C(285), C(295), C(305), C(315), C(325),
C(335), C(345), C(355), C(365), C(375), C(385), C(395), C(400), C(405), C(410),
C(415), C(420), C(425), C(430), C(435), C(440), C(445), C(450), C(455), C(459),
C(460), C(465), C(470), C(475), and C(479), are not transmitted.

Figure 4:
FIG. 4 is a block diagram of the Robust AMR Traffic Synchronized Control Channel (RATSCCH) format for the long frame.

The RATSCCH long frame employs a different format within the TCH block which is shown in FIG. 4. RATSCCH is used in two cases. At the very beginning of the connection between handset and base station, it is used for long-frame synchronization. Also, in some corner cases, the in-band message in RATSCCH is used to give the encoder mode information together with the in-band message of the normal frame. RATSCCH as used in the present invention is comparable to the formats widely used in GSM/3G systems for telling remote PS/CS to change AMR mode and class.

Figure 5:
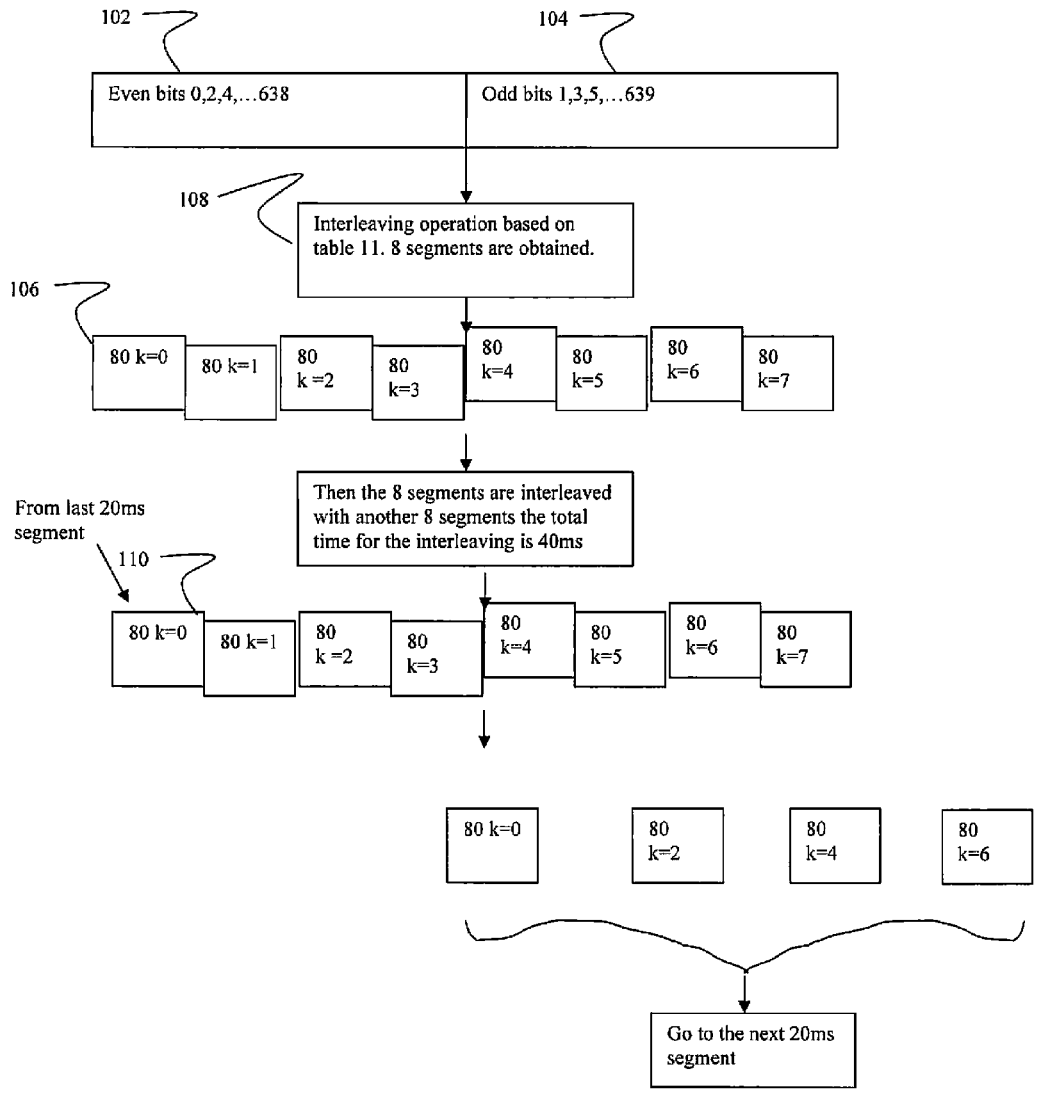
FIG. 5 is a block diagram of an interleaving scheme for the encoded data.

In one embodiment, interleaving of the data of the long frame for transmission in the standard PHS 5 ms bursts is accomplished as shown in FIG. 5. The bits of the long frame are interleaved as shown in Table 11.

TABLE 11

Interleaving Table for PHS Load

| K = 0 | 1 | 2 | 3 | 4 | 5 | 6 | 7 | |
|---|---|---|---|---|---|---|---|---|
| 0 | 513 | 442 | 307 | 172 | 37 | 550 | 415 | 0 |
| 64 | 577 | 506 | 371 | 236 | 101 | 614 | 479 | 1 |
| 128 | 57 | 570 | 435 | 300 | 165 | 30 | 543 | 2 |
| 192 | 121 | 634 | 499 | 364 | 229 | 94 | 607 | 3 |
| 256 | 185 | 50 | 563 | 428 | 293 | 158 | 23 | 4 |
| 320 | 249 | 114 | 627 | 492 | 357 | 222 | 87 | 5 |
| 384 | 313 | 178 | 43 | 556 | 421 | 286 | 151 | 6 |
| 448 | 377 | 242 | 107 | 620 | 485 | 350 | 215 | 7 |
| 512 | 441 | 306 | 171 | 36 | 549 | 414 | 279 | 8 |

TABLE 11-continued

Interleaving Table for PHS Load

| K = 0 | 1 | 2 | 3 | 4 | 5 | 6 | 7 | |
|---|---|---|---|---|---|---|---|---|
| 576 | 505 | 370 | 235 | 100 | 613 | 478 | 343 | 9 |
| 56 | 569 | 434 | 299 | 164 | 29 | 542 | 407 | 10 |
| 120 | 633 | 498 | 363 | 228 | 93 | 606 | 471 | 11 |
| 184 | 49 | 562 | 427 | 292 | 157 | 22 | 535 | 12 |
| 248 | 113 | 626 | 491 | 356 | 221 | 86 | 599 | 13 |
| 312 | 177 | 42 | 555 | 420 | 285 | 150 | 15 | 14 |
| 376 | 241 | 106 | 619 | 484 | 349 | 214 | 79 | 15 |
| 440 | 305 | 170 | 35 | 548 | 413 | 278 | 143 | 16 |
| 504 | 369 | 234 | 99 | 612 | 477 | 342 | 207 | 17 |
| 568 | 433 | 298 | 163 | 28 | 541 | 406 | 271 | 18 |
| 632 | 497 | 362 | 227 | 92 | 605 | 470 | 335 | 19 |
| 48 | 561 | 426 | 291 | 156 | 21 | 534 | 399 | 20 |
| 112 | 625 | 490 | 355 | 220 | 85 | 598 | 463 | 21 |
| 176 | 41 | 554 | 419 | 284 | 149 | 14 | 527 | 22 |
| 240 | 105 | 618 | 483 | 348 | 213 | 78 | 591 | 23 |
| 304 | 169 | 34 | 547 | 412 | 277 | 142 | 7 | 24 |
| 368 | 233 | 98 | 611 | 476 | 341 | 206 | 71 | 25 |
| 432 | 297 | 162 | 27 | 540 | 405 | 270 | 135 | 26 |
| 496 | 361 | 226 | 91 | 604 | 469 | 334 | 199 | 27 |
| 560 | 425 | 290 | 155 | 20 | 533 | 398 | 263 | 28 |
| 624 | 489 | 354 | 219 | 84 | 597 | 462 | 327 | 29 |
| 40 | 553 | 418 | 283 | 148 | 13 | 526 | 391 | 30 |
| 104 | 617 | 482 | 347 | 212 | 77 | 590 | 455 | 31 |
| 168 | 33 | 546 | 411 | 276 | 141 | 6 | 519 | 32 |
| 232 | 97 | 610 | 475 | 340 | 205 | 70 | 583 | 33 |
| 296 | 161 | 26 | 539 | 404 | 269 | 134 | 63 | 34 |
| 360 | 225 | 90 | 603 | 468 | 333 | 198 | 127 | 35 |
| 424 | 289 | 154 | 19 | 532 | 397 | 262 | 191 | 36 |
| 488 | 353 | 218 | 83 | 596 | 461 | 326 | 255 | 37 |
| 552 | 417 | 282 | 147 | 12 | 525 | 390 | 319 | 38 |
| 616 | 481 | 346 | 211 | 76 | 589 | 454 | 383 | 39 |
| 32 | 545 | 410 | 275 | 140 | 5 | 518 | 447 | 40 |
| 96 | 609 | 474 | 339 | 204 | 69 | 582 | 511 | 41 |
| 160 | 25 | 538 | 403 | 268 | 133 | 62 | 575 | 42 |
| 224 | 89 | 602 | 467 | 332 | 197 | 126 | 639 | 43 |
| 288 | 153 | 18 | 531 | 396 | 261 | 190 | 55 | 44 |
| 352 | 217 | 82 | 595 | 460 | 325 | 254 | 119 | 45 |
| 416 | 281 | 146 | 11 | 524 | 389 | 318 | 183 | 46 |
| 480 | 345 | 210 | 75 | 588 | 453 | 382 | 247 | 47 |
| 544 | 409 | 274 | 139 | 4 | 517 | 446 | 311 | 48 |
| 608 | 473 | 338 | 203 | 68 | 581 | 510 | 375 | 49 |
| 24 | 537 | 402 | 267 | 132 | 61 | 574 | 439 | 50 |
| 88 | 601 | 466 | 331 | 196 | 125 | 638 | 503 | 51 |
| 152 | 17 | 530 | 395 | 260 | 189 | 54 | 567 | 52 |
| 216 | 81 | 594 | 459 | 324 | 253 | 118 | 631 | 53 |
| 280 | 145 | 10 | 523 | 388 | 317 | 182 | 47 | 54 |
| 344 | 209 | 74 | 587 | 452 | 381 | 246 | 111 | 55 |
| 408 | 273 | 138 | 3 | 516 | 445 | 310 | 175 | 56 |
| 472 | 337 | 202 | 67 | 580 | 509 | 374 | 239 | 57 |
| 536 | 401 | 266 | 131 | 60 | 573 | 438 | 303 | 58 |
| 600 | 465 | 330 | 195 | 124 | 637 | 502 | 367 | 59 |
| 16 | 529 | 394 | 259 | 188 | 53 | 566 | 431 | 60 |
| 80 | 593 | 458 | 323 | 252 | 117 | 630 | 495 | 61 |
| 144 | 9 | 522 | 387 | 316 | 181 | 46 | 559 | 62 |
| 208 | 73 | 586 | 451 | 380 | 245 | 110 | 623 | 63 |
| 272 | 137 | 2 | 515 | 444 | 309 | 174 | 39 | 64 |
| 336 | 201 | 66 | 579 | 508 | 373 | 238 | 103 | 65 |
| 400 | 265 | 130 | 59 | 572 | 437 | 302 | 167 | 66 |
| 464 | 329 | 194 | 123 | 636 | 501 | 366 | 231 | 67 |
| 528 | 393 | 258 | 187 | 52 | 565 | 430 | 295 | 68 |
| 592 | 457 | 322 | 251 | 116 | 629 | 494 | 359 | 69 |
| 8 | 521 | 386 | 315 | 180 | 45 | 558 | 423 | 70 |
| 72 | 585 | 450 | 379 | 244 | 109 | 622 | 487 | 71 |
| 136 | 1 | 514 | 443 | 308 | 173 | 38 | 551 | 72 |
| 200 | 65 | 578 | 507 | 372 | 237 | 102 | 615 | 73 |
| 264 | 129 | 58 | 571 | 436 | 301 | 166 | 31 | 74 |
| 328 | 193 | 122 | 635 | 500 | 365 | 230 | 95 | 75 |
| 392 | 257 | 186 | 51 | 564 | 429 | 294 | 159 | 76 |
| 456 | 321 | 250 | 115 | 628 | 493 | 358 | 223 | 77 |
| 520 | 385 | 314 | 179 | 44 | 557 | 422 | 287 | 78 |
| 584 | 449 | 378 | 243 | 108 | 621 | 486 | 351 | 79 |

For interleaving, the bits are split into even and odd bits 102, 104 and interleaved according to the table. Eight segments 106 of 80 bits of data are obtained 108 which are then interleaved with eight segments from the prior 20 ms segment 110. After interleaving, two segments at a time are transmitted in the TCH block of the PHS slot.

Figure 6:
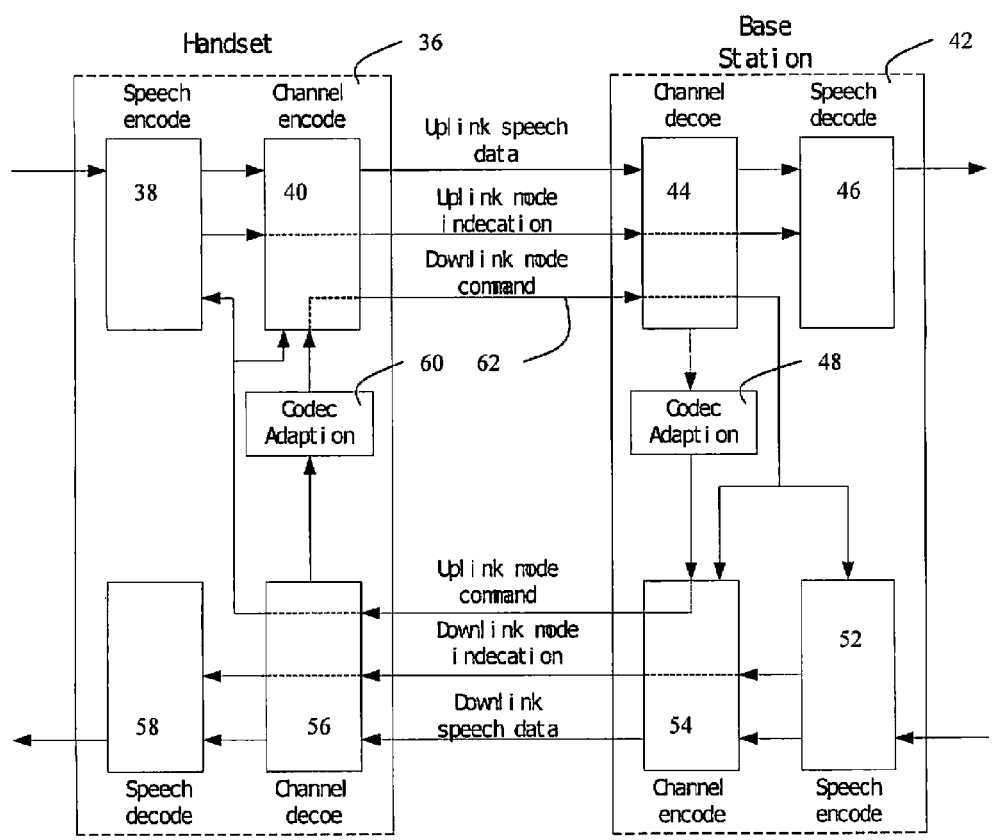
FIG. 6 is a schematic diagram of the elements of a handset and base station system employing the present invention.

In the normal data transfer mode, the system operates in a similar manner to AMR in GSM and 3GPP systems. As shown in FIG. 6. In the handset 36, speech encoder 38 for input voice samples the data and provides coded data to a channel encoder 40 which converts the long frames to PHS format 5 ms frames for transmission. Uplink speech data is then transmitted to the base station 42 in which a channel decoder 44 collapses the PHS standard frames into the long frame format which is then passed to the speech decoder 46. During the decoding, the bit error and corresponding SNR (relative channel condition) is estimated by the Viterbi decoder in the convolution decoding process. After estimation within a certain time period, the codec adaption unit 48 makes decision whether the encode mode should be changed in the receiving direction, as will be described in detail subsequently. A request message, uplink node command 50, is inserted into the in-band area and transfer to the handset.

Operation of downlinking data from the base station to the handset is comparable with the speech data encoded by speech encoder 52 for input voice samples the data and provides coded data to a channel encoder 54 which converts the long frames to PHS format 5 ms frames for transmission. Downlink speech data is then transmitted to the handset in which a channel decoder 56 collapses the PHS standard frames into the long frame format which is then passed to the speech decoder 58. During the decoding, the bit error and corresponding SNR (relative channel condition) is estimated. After estimation within a certain time period, the codec adaption unit 60 makes decision whether the encode mode should be changed in the receiving direction. A request message, downlink mode command 62, is inserted into the in-band area and transfer to the base station.

Figures 7A, 7B:
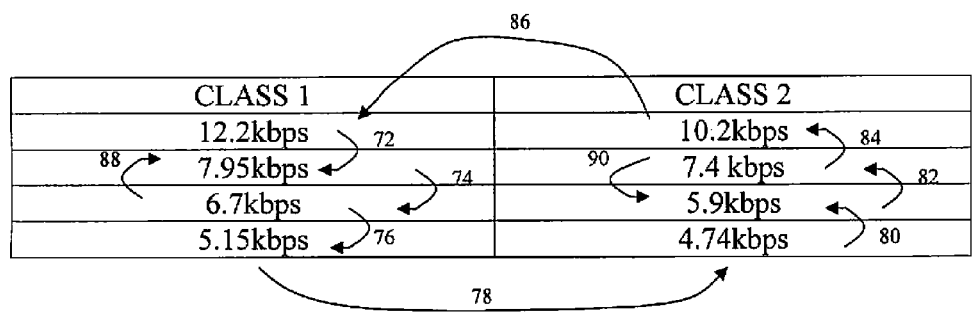
FIG. 7a is a table representation of the AMR mode and division into Mode and class for use in the present invention; and, FIG. 7b is a flow chart representation of the mode switching algorithm using class as employed in the present invention.

For each transmitted long-frame, the encode mode (index) of the transmitter is determined based on the mode command which shifts the mode using an algorithm based on class as shown in FIGS. 7*a* and 7*b*. PHS standard requirements allow a simplified algorithm for mode adjustment over standard GSM/3G systems. Adjacent modes are in different classes effectively splitting the total number of modes as shown in the table of FIG. 7*a*. As shown in FIG. 7*b*, if the transmission is proceeding in mode 11 and class 1 (12.2 kbps) and the error estimate from the convolution decoder indicates a reduction in bit rate is required, the mode command causes a shift 72 of one mode down within the same class, i.e. to mode 10 class 1 (7.95 kbps). If the BER is still too high, a second shift 74 down is commanded to mode 01 class 1 (6.7 kbps). Continuing high BER results in yet another shift 76 down to mode 00 class 1 (5.15 kbps). If the BER remains too high, a final shift 78 across class to mode 00 class 2 (4.74 kbps) is made. Thus the entire range of available modes is spanned in four command shifts. Similarly, if BER is reduced below a predefined threshold, the command shifts up the class for increased transmission speed. For example if the system has been in lowest mode, i.e. mode 00 class 2 (4.74 kbps) and BER is now improving, a command shift 80 raises the mode to mode 01 class 2 (5.9 kbps) as opposed to returning to mode 00 class 1. Further improvement results in a shift 82 to mode 10 class 2 (7.4 kbps), with yet further improvement resulting in a shift 84 to mode 11 class 2 (10.2 kbps). If further improvement is available, the algorithm then causes the mode to shift class 86, i.e. to mode 11 class 1 (12.2 kbps) for highest transmission speed. Improvement or deterioration in BER in the middle of a class range results in movement up or down within the class as exemplified by shifts 88 and 90. The algorithm allows a circular shifting pattern based on mode within the class, shifting class only when reaching a minimum or maximum transmission capability within the class.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system comprising:
    a header stripper configured to strip header data from a plurality of legacy system frames, each of the plurality of legacy system frames (i) being in accordance with a legacy system frame format and (ii) including a header block and a traffic channel block;
    a first encoder configured to encode speech data for a plurality of slots of the traffic channel blocks;
    a second encoder configured to encode the stripped header data as a frame header;
    a combiner configure to combine the frame header and the encoded speech data to generate a frame;
    a segmenter to segment the frame into a plurality of segments; and
    a transmitter configured to transmit the plurality of segments as traffic channel data in accordance with the legacy system frame format.

2. The system of claim 1, wherein the first encoder comprises an adaptive multi-rate codec, wherein the adaptive multi-rate codec is configured to encode the speech data.

3. The system of claim 2, wherein the adaptive multi-rate codec is configured to select a codec mode based on channel quality.

4. The system of claim 3, wherein the adaptive multi-rate codec selects the codec mode by:
    at least one of (i) shifting down from a first mode to a second mode within a first class and (ii) shifting down from the first mode to a third mode in a second class upon degradation of a bit error rate; and
    at least one of (i) shifting up from the first mode to a fourth mode within the first class and (ii) shifting up from the first mode to a fifth mode of the second class upon improvement of the bit error rate.

5. The system of claim 1, wherein the stripped header data comprises channel identification and slow associated control data.

6. The system of claim 1, wherein the second encoder comprises a convolution encoder configured to encode the stripped header data.

7. The system of claim 6, wherein the convolution encoder comprises a ½ convolution encoder.

8. A system comprising:
    a header stripper configured to strip headers from a first plurality of slots of data, wherein each of the first plurality of slots of data comprise a header block and a traffic channel block;
    a first encoder configured to combine and encode the headers of the first plurality of slots of data to generate a frame header;
    a second encoder configured to combine and encode the traffic channel blocks of the first plurality of slots of data to generate data samples;
    a third encoder configured to combine and encode the frame header and the data samples to generate an encoded frame;
    a segmenter configured to segment the encoded frame into a second plurality of slots of data; and
    a transmitter configured to transmit the second plurality of slots of data.

9. The system of claim 8, wherein the first plurality of slots of data and the second plurality of slots of data are personal handy phone system slots of data.

10. The system of claim 8, wherein the first plurality of slots of data and the second plurality of slots of data are in a legacy system frame format.

11. The system of claim 8, wherein the combiner is configured to:
    combine the frame header, in-band data, and the data samples to generate a frame; and
    encode the frame to generate the encoded frame.

12. The system of claim 8, wherein the second encoder includes an adaptive multi-rate encoder.

13. The system of claim 8, wherein the third encoder includes a convolutional encoder.

* * * * *